(12) United States Patent
Chilakamarthy Venkata et al.

(10) Patent No.: US 11,640,276 B2
(45) Date of Patent: May 2, 2023

(54) MASK DEVICE FOR A LISTENING DEVICE

(71) Applicant: KYNDRYL, INC., New York, NY (US)

(72) Inventors: Naga ManojKasyap Chilakamarthy Venkata, Austin, TX (US); Zachary A. Silverstein, Austin, TX (US); Natalie Watkins, Austin, TX (US); Evan M. Blache, Cedar Park, TX (US)

(73) Assignee: KYNDRYL, INC., New York, NY (US)

( * ) Notice: Subject to any disclaimer, the term of this patent is extended or adjusted under 35 U.S.C. 154(b) by 149 days.

(21) Appl. No.: 16/950,869

(22) Filed: Nov. 17, 2020

(65) Prior Publication Data
US 2022/0156038 A1    May 19, 2022

(51) Int. Cl.
*G06F 3/16* (2006.01)
*G10L 15/08* (2006.01)
*G10L 15/22* (2006.01)

(52) U.S. Cl.
CPC .............. *G06F 3/167* (2013.01); *G10L 15/08* (2013.01); *G10L 15/22* (2013.01); *G10L 2015/223* (2013.01)

(58) Field of Classification Search
CPC ......... G06F 3/167; G10L 15/08; G10L 15/22; G10L 2015/223
See application file for complete search history.

(56) References Cited

U.S. PATENT DOCUMENTS

| | | | |
|---|---|---|---|
| 7,761,292 | B2 | 7/2010 | Ferencz |
| 10,002,259 | B1 | 6/2018 | Mai |
| 10,282,166 | B2 | 5/2019 | Fountaine |
| 10,346,614 | B1 | 7/2019 | Ko |
| 11,024,304 | B1* | 6/2021 | Smith ................. G10L 15/22 |
| 11,276,383 | B2* | 3/2022 | Barski ................. G10K 11/20 |
| 2019/0013019 | A1* | 1/2019 | Lawrence ........... G10L 15/1815 |

(Continued)

FOREIGN PATENT DOCUMENTS

| | | |
|---|---|---|
| CN | 103404073 B | 9/2016 |
| JP | 2002541736 A | 12/2002 |

(Continued)

OTHER PUBLICATIONS

"Thinking About Buying A Smart Home Device? Here's What You Need To Know About Security," Forbes, Mar. 22, 2019, 5 pages. <https://www.forbes.com/sites/quora/2019/03/22/thinking-about-buying-a-smart-home-device-heres-what-you-need-to-know-about-security/#131b7cc3292c>.

(Continued)

*Primary Examiner* — Brian L Albertalli
(74) *Attorney, Agent, or Firm* — Erik Swanson; Andrew M. Calderon; Calderon Safran & Cole P.C.

(57) ABSTRACT

A masking device for a virtual assistant, the masking device including a body configured to at least partially block a virtual assistant microphone of the virtual assistant, and an assistant initializer in or on an inside of the body. The (Continued)

masking device also includes a masking device microphone on an outside of the body, and a processor communicatively connected to the assistant initializer and the microphone. The processor is configured to employ the assistant initializer to control an audio communication channel to the virtual assistant in response to the microphone receiving a first audio key term from a user.

17 Claims, 8 Drawing Sheets

(56) References Cited

U.S. PATENT DOCUMENTS

| | | | | |
|---|---|---|---|---|
| 2019/0043466 | A1* | 2/2019 | Masterson | H04R 1/025 |
| 2019/0074002 | A1* | 3/2019 | Christopher | G06F 3/167 |
| 2019/0199521 | A1 | 6/2019 | Sayers | |
| 2019/0287529 | A1 | 9/2019 | Christopher | |
| 2019/0333493 | A1* | 10/2019 | Zenk | G10L 15/22 |
| 2019/0371339 | A1* | 12/2019 | Humphrey | G10L 15/30 |
| 2020/0075035 | A1* | 3/2020 | Garth, III | H02P 8/22 |
| 2020/0211522 | A1* | 7/2020 | Gomez | H04R 3/00 |
| 2020/0260186 | A1* | 8/2020 | Stachura | G10L 15/30 |
| 2020/0265825 | A1* | 8/2020 | Fong | G10L 25/51 |
| 2020/0337186 | A1* | 10/2020 | Eveleigh | H05K 9/0007 |
| 2020/0342842 | A1* | 10/2020 | Cunningham | G10K 11/162 |
| 2021/0082426 | A1* | 3/2021 | Shuman | G06F 3/167 |
| 2021/0327432 | A1* | 10/2021 | Schwartz | G10L 21/06 |

FOREIGN PATENT DOCUMENTS

| | | |
|---|---|---|
| WO | 2016093723 A1 | 6/2016 |
| WO | WO-2019171963 A1 * | 9/2019 |

OTHER PUBLICATIONS

Acar et al., "Peek-a-Boo: I see your smart home activities, even encrypted!" ARXIV.org, Aug. 8, 2018, pp. 1-14. <https://arxiv.org/pdf/1808.02741.pdf>.

Edu et al., "Smart Home Personal Assistants: A Security and Privacy Review," ARXIV.org, Mar. 13, 2019, pp. 1-27. <https://arxiv.org/pdf/1903.05593.pdf>.

Mell et al., "The NIST Definition of Cloud Computing," Recommendations of the National Institute of Standards and Technology, U.S. Department of Commerce, Special Publication 800-145, Sep. 2011, 7 pages.

Sacks, "Alexa privacy fail highlights risks of smart speakers," NBC News, May 26, 2018, 3 pages. <https://www.nbcnews.com/tech/innovation/alexa-privacy-fail-highlights-risks-smart-speakers-n877671>.

* cited by examiner

MASK DEVICE FOR A LISTENING DEVICE

BACKGROUND

The present disclosure relates to sensitive information security, and more specifically, to controlling information available to a virtual assistant device.

A virtual assistant device, such as Amazon® Alexa®, Google Assistant™, and Apple® Siri®, can help a user by performing a number of different functions, such as Internet searching, playing music, and/or calendaring, among many others. Thereby, many virtual assistant devices are "Internet of Things" ("IoT") devices in that they are communicatively connected to other networks, such as their manufacturer's server, a cloud, or the Internet, for example, to process commands from users. Users often interact with a virtual assistant device through verbal sounds, such as spoken numbers and words. To prevent the user from having to physically touch the virtual assistant to begin an interaction, a virtual assistant is often configured to constantly be listening for a key term that indicates the user's desire to interact. However, there may be times when a user does not want a virtual assistant to be listening, for example, when the user is having a discussion that contains sensitive information.

SUMMARY

According to some embodiments of the present disclosure, a masking device for a virtual assistant, the masking device including a body configured to at least partially block a virtual assistant microphone of the virtual assistant, and an assistant initializer in or on an inside of the body. The masking device also includes a masking device microphone on an outside of the body, and a processor communicatively connected to the assistant initializer and the microphone. The processor is configured to employ the assistant initializer to control an audio communication channel to the virtual assistant in response to the microphone receiving a first audio key term from a user.

According to some embodiments of the present disclosure, a method of operating a masking device for a virtual assistant includes preventing, by the masking device, the virtual assistant from processing verbal sounds from a user, and receiving, by the masking device, a first audio key term spoken by a user. The method also includes initializing the masking device in response to receiving the first audio key term, initializing, by the masking device, the virtual assistant, and permitting, by the masking device, a verbal command from the user to reach the initialized virtual assistant.

DETAILED DESCRIPTION

Figure 1:
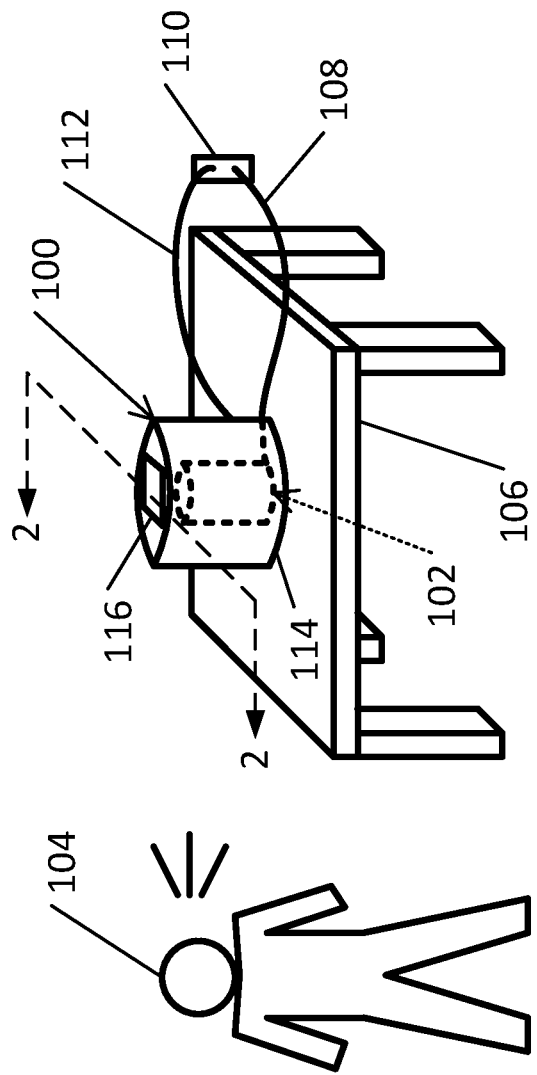
FIG. 1 is a perspective view of a masking device, a virtual assistant, and a user, according to embodiments of the present disclosure.

FIG. 1 is a perspective view of masking device 100, virtual assistant 102, and user 104. In the illustrated embodiment, masking device 100 and virtual assistant 102 are resting on table 106, with masking device 100 substantially surrounding virtual assistant 102. In other words, masking device 100 completely covers virtual assistant 102, except for the bottom of virtual assistant 102 (that is in contact with table 106) and a small slot at the bottom of masking device 100 (shown in FIG. 2). This slot allows cord 108 to connect with outlet 110 to provide electrical power to virtual assistant 102. Similarly, masking device 100 has cord 112 which connects with outlet 110 to provide electrical power to masking device 100.

Masking device 100 comprises body 114 and control system 116. Body 114 can be comprised of acoustical material, such as foam, fabric, and/or metal, that can attenuate, dampen, and/or absorb sound. Since most household furniture or countertops, such as table 106, also attenuate or absorb sound, the net effect is that body 114 can sonically insulate virtual assistant 102 to prevent sound from reaching virtual assistant 102. On the other hand, control system 116 can control whether sound reaches virtual assistant 102, for example, by opening a communication channel between virtual assistant 102 and, for example, user 104.

In the illustrated embodiment, user 104 is speaking, for example, on a phone (not shown) or to another user (not shown). User 104 may be discussing sensitive information that user 104 would want to keep confidential, such as their health history or credit card information. While virtual assistant 102 may be listening to ambient sound to detect its particular initialization key term (e.g., "Alexa" or "Siri"), masking device 100 can prevent virtual assistant 102 from hearing the sensitive information being stated by user 104. This prevents the processing and/or dissemination of the sensitive information by virtual assistant 102 (e.g., via its IoT connectivity), which keeps the sensitive information safe and secure.

Figure 2:
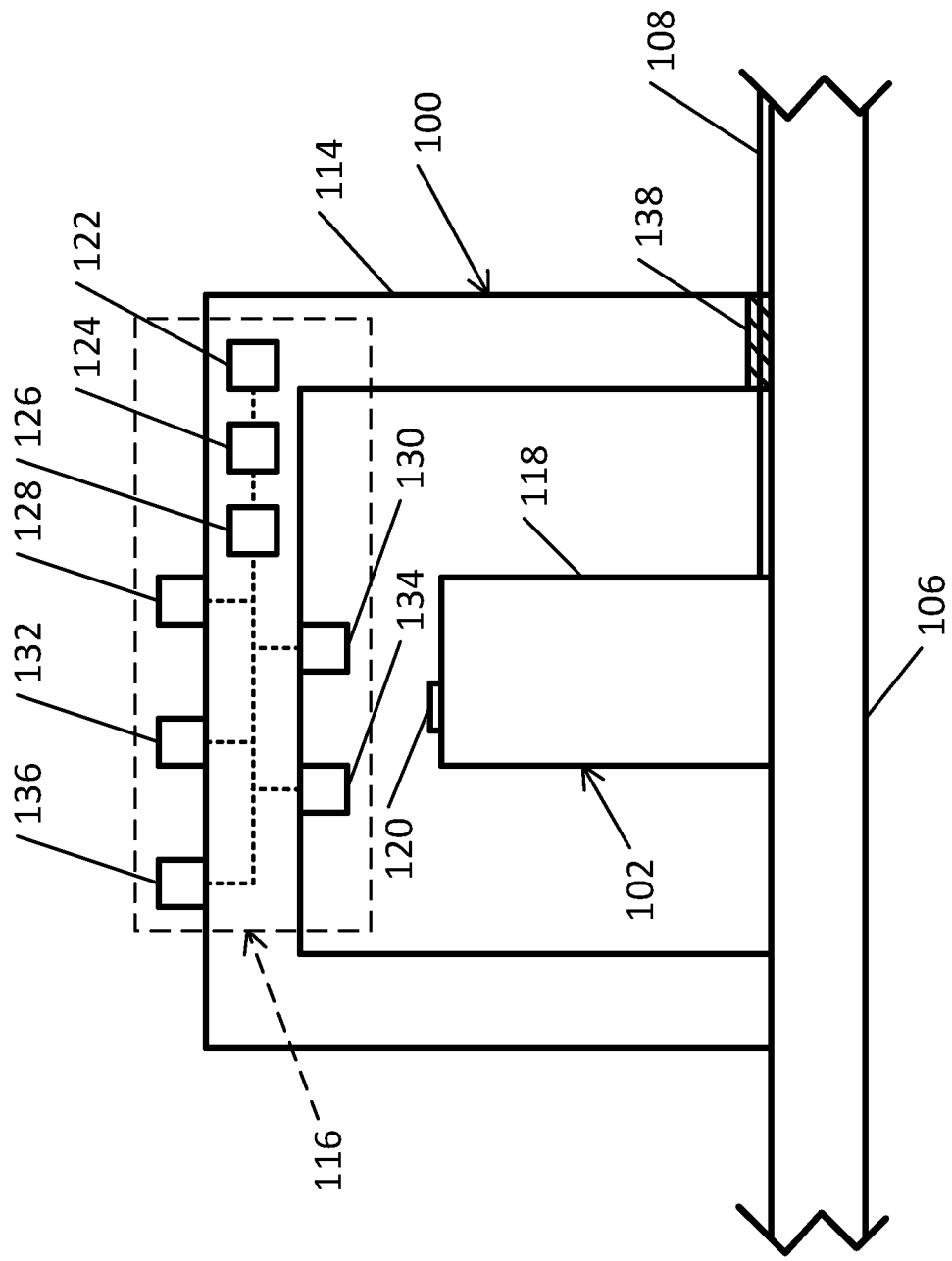
FIG. 2 is a cross-sectional view along line 2-2 in FIG. 1 of the masking device and the virtual assistant, according to embodiments of the present disclosure.

FIG. 2 is a cross-sectional view along line 2-2 in FIG. 1 of masking device 100 and virtual assistant 102 on table 106. In the illustrated embodiment, virtual assistant 102 comprises body 118 and microphone 120. In some conventional usages, microphone 120 would be constantly listening for user 104 (shown in FIG. 1) to state a key term, which would indicate to virtual assistant 102 that a command was forthcoming. Thereby, virtual assistant 102 would be initialized and be ready to act. However, in the illustrated embodiment, masking device 100 is positioned over virtual assistant 102, so masking device 100 can selectively block sounds from user 104.

More specifically, control system 116 of masking device 100 comprises battery 122, memory 124, processor 126, external microphone/speaker 128, internal microphone/speaker 130, record button 132, internal antenna 134, and external antenna 136, which can be communicatively and/or electrically connected to one another. In the illustrated embodiment, battery 122, memory 124, and processor 126 are mounted in body 114; external microphone/speaker 128, record button 132, and external antenna 136 are mounted on the exterior of body 114; and internal microphone/speaker 130 and internal antenna 134 are mounted on the interior of body 114, although different arrangements of control systems 116 are possible in other embodiments. In addition, body 114 includes slot 138 so that cord 108 can pass through masking device 100.

Battery 122 provides power to control system 116 (in case cord 112, not shown, is unplugged), and memory 124 and processor 126 perform computing functions for control system 116. External microphone/speaker 128 allows masking device 100 to listen for its audio initialization key term (e.g., "Watson" or "xylophone"), which can be spoken by, for example, user 104. Internal microphone/speaker 130 allows masking device 100 to play masking noise (e.g., white noise or active noise cancelation such as destructive sound waves) to further prevent virtual assistant 102 from being able to process sound originating from outside of masking device 100. In addition, internal microphone/speaker 130 can be used to sonically communicate with virtual assistant 102, for example, to act as an assistant initializer. For example, using record button 132, user 104 can record messages for virtual assistant 102 (e.g., the audio initialization key term for virtual assistant 102) that can be communicated to virtual assistant 102 using internal microphone/speaker 130. In addition, record button 132 can be used to set or reset the initialization key term for masking device 100.

In the illustrated embodiment, masking device 100 includes internal antenna 134 for non-sonic, wireless communication (e.g., wi-fi or near field) with virtual assistant 102. In addition, masking device 100 also includes external antenna 136 for non-sonic, wireless communication (e.g., wi-fi or cellular) with a secure network, for example, a local area network where masking device 100 resides, a network owned by the manufacturer of masking device 100, or the provider of masking device 100 to user 104. In such embodiments, any information being transmitted could be treated as sensitive. In other embodiments, external antenna 136 can be used for communication with a network, such as a local area network, a cloud, or the Internet. In such embodiments, sensitive information can be prevented from being transmitted.

Internal antenna 134 and/or external antenna 136 can be used, for example, to set up masking device 100. More specifically, internal antenna 134 could communicate with virtual assistant 102 to identify what brand and model virtual assistant 102 is. In addition to or in the alternative, external antenna 136 can search a local network for virtual assistant 102 to identify what brand and model virtual assistant 102 is. In either scenario, this information can be used in conjunction with external antenna 136 to communicate with a network that includes the key term used to initialize virtual assistant 102 (assuming that the key term is not already stored in memory 124). For another example, external antenna 136 can be used to communicate with a secure network that can assist with the processing of sounds received by external microphone/speaker 128. Masking device 100 can also be set up using input from user 104. More specifically, user 104 can use record button 132 and state the initialization key term for masking device 100, for example, if a predetermined initialization key term is not set or is being reset. In addition, user 104 can use record button 132 and state the initialization key term for virtual assistant 102 (e.g., "Alexa" or "Siri"). A recording of the key term as stated by user 104 can be stored in memory 124 for use later.

In the illustrated embodiment, masking device 100 normally prevents intelligible sound from reaching virtual assistant 102, for example, using body 114 and internal microphone/speaker 130. When user 104 would like to communicate with virtual assistant 102, user 104 can state a key term to initialize masking device 100. In some embodiments, there are multiple key terms that are predetermined and/or created by user 104. In such embodiments, the key terms can be indications that a command or question is forthcoming. For example, a key term could be the phrase, "I don't know what I am doing on [day-of-the-week]", which would indicate that virtual assistant 102 should access the calendar of user 104. In addition, while specific key terms may be predetermined or added by user 104, masking device 100 can expand the list of key terms using, for example, natural language processing and/or contextual analysis, either in real time, after modifying the list of key terms, and/or periodically.

After hearing the key term, masking device 100 can cease emitting masking sounds by internal microphone/speaker 130 to microphone 120. Instead, internal microphone/speaker 130 can be employed to state the key term to initialize virtual assistant 102. Subsequently, the pair of external microphone/speaker 128 and internal microphone/speaker 130 can create an audio communication channel between user 104 and virtual assistant 102 through body 114. In addition, internal microphone/speaker 130 can repeat the command given by user 104 if it was stated in rapid succession to the masking device 100 key term (i.e., before virtual assistant 202 could be initialized). This communication channel can be closed after a change criterion is met, for example, after a predetermined amount of time has passed, after a predetermined amount of time has passed after the last communication, after a finalization key term has been stated by user 104 (which can be the same as or different than the initialization key term), or after masking device 100 has determined that user 104 is no longer communicating with virtual assistant 102 (e.g., the speech of user 104 has been analyzed and determined to be no longer directed toward virtual assistant 102), and/or user 104 resumes or begins discussing sensitive information.

The components, configuration, and operation of masking device 100 allow for virtual assistant 102 to be prevented from constantly listening to the conversations of user 104 while still allowing virtual assistant 102 to be ready to respond to a verbal command from user 104 in real time. Masking device 100 also does not require user 104 to state the key term for masking device 100 and for virtual assistant 102, since masking device 100 can initialize virtual assistant 102.

Figure 3:
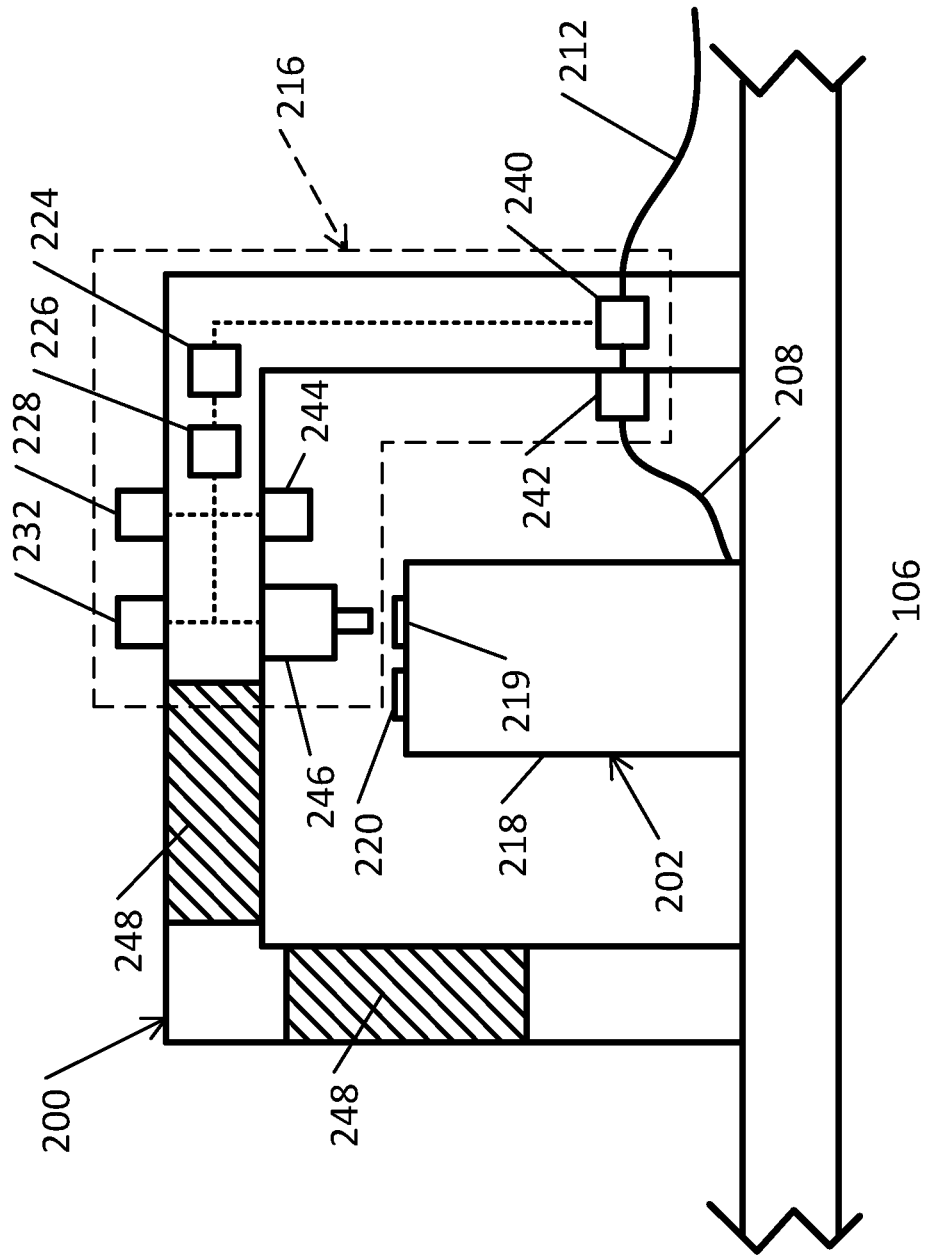
FIG. 3 is a cross-sectional view along line 2-2 in FIG. 1 of an alternative masking device and an alternative virtual assistant, according to embodiments of the present disclosure.

FIG. 3 is a cross-sectional view along line 2-2 in FIG. 1 of an alternative masking device 200 and an alternative virtual assistant 202 on table 106. The components and features shown in FIG. 3 that are similar to that of FIGS. 1 and 2 have reference numerals that are one hundred greater. For example, memory 124 in FIG. 2 is labelled as memory 224 in FIG. 3.

In the illustrated embodiment, virtual assistant 202 comprises body 218, mute button 219, and microphone 220. In some conventional usages (e.g., when masking device 200 is not positioned over virtual assistant 202), microphone 220 would be constantly listening for user 104 (shown in FIG. 1) to state an audio key term, unless user 104 presses mute button 219 (which could instead be a power on/off button). When mute button 219 is pressed, microphone 220 is deactivated and the communication channel between user 104 and virtual assistant 202 is closed. The key term would indicate to virtual assistant 202 that a command was forthcoming, so virtual assistant 202 would be initialized and be ready to act. However, in the illustrated embodiment, masking device 200 is positioned over virtual assistant 202, so masking device 200 can selectively stop virtual assistant 202 from listening to sounds from user 104.

More specifically, control system 216 of masking device 200 comprises memory 224, processor 226, external microphone/speaker 228, record button 232, switch 240, port 242, camera 244, and actuator 246 which can be communicatively and/or electrically connected to one another. In the illustrated embodiment, memory 224, processor 226, and switch 240 are mounted in body 114; external microphone/speaker 228 and record button 232 are mounted on the exterior of body 114; and port 242, camera 244, and actuator 246 are mounted on the interior of body 214, although different arrangements of control systems 216 are possible in other embodiments. In addition, body 214 includes a plurality of apertures 248 (shown using hatching) so that sound waves (e.g., from user 104) can always reach virtual assistant 202 (regardless of whether virtual assistant 202 is listening or not).

Cord 212 provides power to control system 216 via switch 240, and cord 212 selectively provides power to virtual assistant 202 via switch 240 and port 242, into which cord 208 is plugged. Memory 224 and processor 226 perform computing functions for control system 216. External microphone/speaker 228 allows masking device 200 to listen for its audio initialization key term (e.g., "Watson" or "xylophone"), which can be spoken by, for example, user 104. In addition, external microphone/speaker 228 can be used to sonically communicate with virtual assistant 202. For example, using record button 232, user 104 can record messages for virtual assistant 202 (e.g., the initialization key term for virtual assistant 202, such as "Alexa" or "Siri") that can be communicated to virtual assistant 202 using internal microphone/speaker 228.

Camera 244 can be used, for example, to set up masking device 200. More specifically, processor 226 can receive image data from camera 244 that can be analyzed to identify what brand and model virtual assistant 202 is. This information can be used to search memory 224 to find the key term used to initialize virtual assistant 202. In addition, camera 244 can be employed to determine the position of mute button 219 and determine if actuator 246 is positioned to properly press mute button 219. For example, if actuator 246 has a piston that moves linearly downward, then actuator 246 should be positioned directly above mute button 219. If actuator 246 is not properly positioned, processor 226 can use external microphone/speaker 228 to indicate to user 104 to reposition masking device 200.

In the illustrated embodiment, masking device 200 normally permits intelligible sound to reach virtual assistant 202, for example, by having apertures 248, having switch 240 in the "on" position, and having actuator 246 retracted from mute button 219. When user 104 would like to temporarily prevent virtual assistant 202 from listening, user 104 can say the initialization key term for masking device 200. The key term can be a predetermined word or phrase, or the key term can be set by user 104 using record button 232 and stored in memory 224. In some embodiments, there are multiple key terms that are predetermined and/or created by user 104. In such embodiments, the key terms are sensitive information or are indications that sensitive information is forthcoming. For example, a key term could be the phrase, "my credit card number is". For another example, a key term could be the first four digits of the credit card of user 104 or the first three digits of the U.S. Social Security number of user 104. In addition, while specific key terms may be predetermined or added by user 104, masking device 100 can expand the list of key terms using, for example, natural language processing and/or contextual analysis, either in real time, after modifying the list of key terms, and/or periodically.

Once masking device 200 hears a key term, the communication channel between user 104 and virtual assistant 202 will be closed. This assistant initialization can occur by actuator 246 pressing mute button 219 and/or by switch 240 cutting off power to virtual assistant 202. The communication channel can be opened again after a change criterion is met, for example, after a predetermined amount of time has passed, after a predetermined amount of time has passed after the last communication, after a finalization key term has been stated by user 104 (which can be the same as or different than the initialization key term), or after masking device 100 has determined that user 104 is no longer discussing sensitive information (e.g., the speech of user 104 has been analyzed and determined to be directed toward a subject matter that does not include sensitive information). The communication channel can be opened again by actuator 246 releasing mute button 219 (or pressing mute button 219 again, depending on how virtual assistant 202 operates) and/or by switch 240 providing power to virtual assistant 202.

The components, configuration, and operation of masking device 200 allow for virtual assistant 202 to be prevented from listening to the sensitive portions of conversations of user 104 while still allowing virtual assistant 202 to normally be ready to respond to a verbal command from user 104 in real time. In addition, masking device 200 is not communicatively connected to an external network, in some embodiments, so any sensitive information stated by user 104 cannot be transmitted to any third parties by masking device 200.

Figure 4:
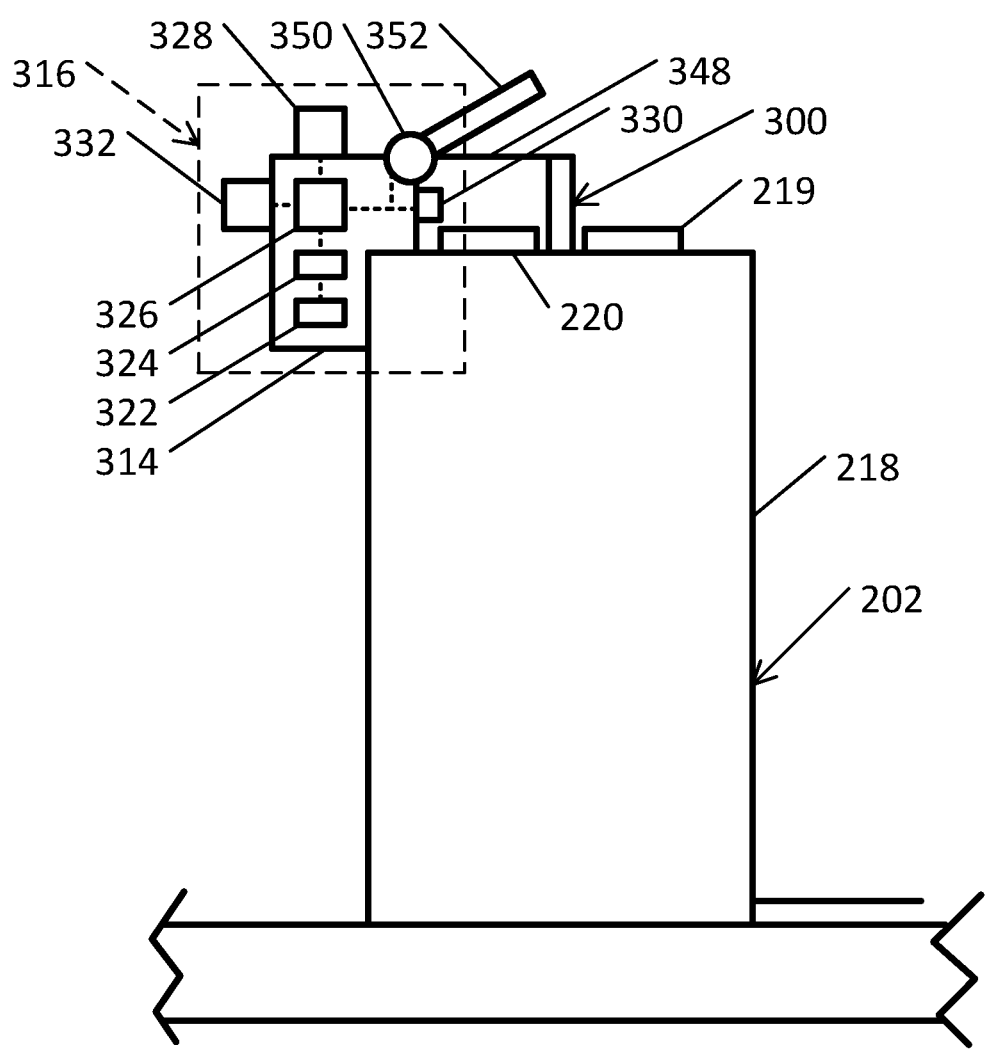
FIG. 4 is a cross-sectional view along line 2-2 in FIG. 1 of an alternative masking device and the alternative virtual assistant, according to embodiments of the present disclosure.

FIG. 4 is a cross-sectional view along line 2-2 in FIG. 1 of alternative masking device 300 and virtual assistant 202. The components and features shown in FIG. 4 that are similar to that of FIGS. 1-3 have reference numerals that are one hundred or two hundred greater.

In the illustrated embodiment, virtual assistant 202 comprises body 218, mute button 219, and microphone 220. In some conventional usages, microphone 220 would be constantly listening for user 104 (shown in FIG. 1) to state a key term, which would indicate to virtual assistant 202 that a command was forthcoming. Thereby, virtual assistant 204 would be initialized and be ready to act. However, in the illustrated embodiment, masking device 300 is adhered to body 218 and surrounds microphone 220 (although not over mute button 219), so masking device 300 can selectively block sounds from user 104.

More specifically, control system 316 of masking device 300 comprises battery 322, memory 324, processor 326, external microphone/speaker 328, internal microphone/speaker 330, record button 332, and actuator 350, which can be communicatively and/or electrically connected to one another. In the illustrated embodiment, battery 322, memory 324, and processor 326 are mounted in body 314; external microphone/speaker 328, record button 332, and actuator 350 are mounted on the exterior of body 314; and internal microphone/speaker 330 is mounted on the interior of body 314 (i.e., in aperture 348), although different arrangements of control systems 316 are possible in other embodiments.

Battery 322 provides power to control system 316, and memory 324 and processor 326 perform computing functions for control system 316. External microphone/speaker 328 allows masking device 300 to listen for its audio initialization key term (e.g., "Watson" or "xylophone"), which can be spoken by, for example, user 104. Internal microphone/speaker 330 allows masking device 300 to play masking noise (e.g., white noise or active noise cancelation such as destructive sound waves) to further prevent virtual assistant 202 from being able to process sound originating from outside of masking device 300. In addition, internal microphone/speaker 330 can be used to sonically communicate with virtual assistant 202, for example, to act as an assistant initializer. For example, using record button 332, user 104 can record messages for virtual assistant 202 (e.g., the audio initialization key term for virtual assistant 202, such as "Alexa" or "Siri") that can be communicated to virtual assistant 202 using internal microphone/speaker 330. In addition, record button 332 can be used to set or reset the initialization key term for masking device 300.

Masking device 300 can be set up using input from user 104. More specifically, user 104 can use record button 332 and state the initialization key term for masking device 300, for example, if a predetermined initialization key term is not set or is being reset. In addition, user 104 can use record button 332 and state the initialization key term for virtual assistant 202. A recording of the key term as stated by user 104 can be stored in memory 324 for use later.

In the illustrated embodiment, masking device 300 normally prevents intelligible sound from reaching virtual assistant 202, for example, using body 314, door 352, and internal microphone/speaker 330. When user 104 would like to communicate with virtual assistant 202, user 104 can state a key term to initialize masking device 300. In some embodiments, there are multiple key terms that are predetermined and/or created by user 104. In such embodiments, the key terms can be indications that a command or question is forthcoming. For example, a key term could be the phrase, "I don't know what I am doing on [day-of-the-week]", which would indicate that virtual assistant 102 should access the calendar of user 104. In addition, while specific key terms may be predetermined or added by user 104, masking device 300 can expand the list of key terms using, for example, natural language processing and/or contextual analysis, either in real time, after modifying the list of key terms, and/or periodically.

After hearing the key term, masking device 300 can cease emitting masking sounds by internal microphone/speaker 330 to microphone 220, and instead internal microphone/speaker 330 can be employed to state the key term to initialize virtual assistant 202. In addition, door 352 is opened by actuator 350. Opening door 352 permits the sound of user 104 to reach virtual assistant 202, thereby creating an audio communication channel between user 104 and virtual assistant 202 through aperture 348. In addition, internal microphone/speaker 330 can repeat the command given by user 104 if it was stated in rapid succession to the masking device 300 key term (i.e., before virtual assistant 202 could be initialized). This communication channel can be closed after a change criterion is met, for example, after a predetermined amount of time has passed, after a predetermined amount of time has passed after the last communication, after a finalization key term has been stated by user 104 (which can be the same as or different than the initialization key term), or after masking device 300 has determined that user 104 is no longer communicating with virtual assistant 202 (e.g., the speech of user 104 has been analyzed and determined to be no longer directed toward virtual assistant 202), and/or user 104 resumes or begins discussing sensitive information.

The components, configuration, and operation of masking device 300 allow for virtual assistant 202 to be prevented from constantly listening to the conversations of user 104 while still allowing virtual assistant 202 to be ready to respond to a verbal command from user 104 in real time. Masking device 300 also does not require user 104 to state the key term for both masking device 300 and for virtual assistant 202, since masking device 300 can initialize virtual assistant 202. In addition, masking device 300 is a smaller device than masking device 100 or masking device 200 since it only covers microphone 220 instead of the entirety of virtual assistant 202.

The embodiments in FIGS. 2-4 include many different features and functionalities. However, many of these features and functionalities are not solely restricted to the embodiment in which they were discussed. Instead, where appropriate, different features and functionalities can be added or subtracted from the illustrated embodiments to make other embodiments. For example, masking device 300 could be an IoT device by adding an antenna.

Figure 5:
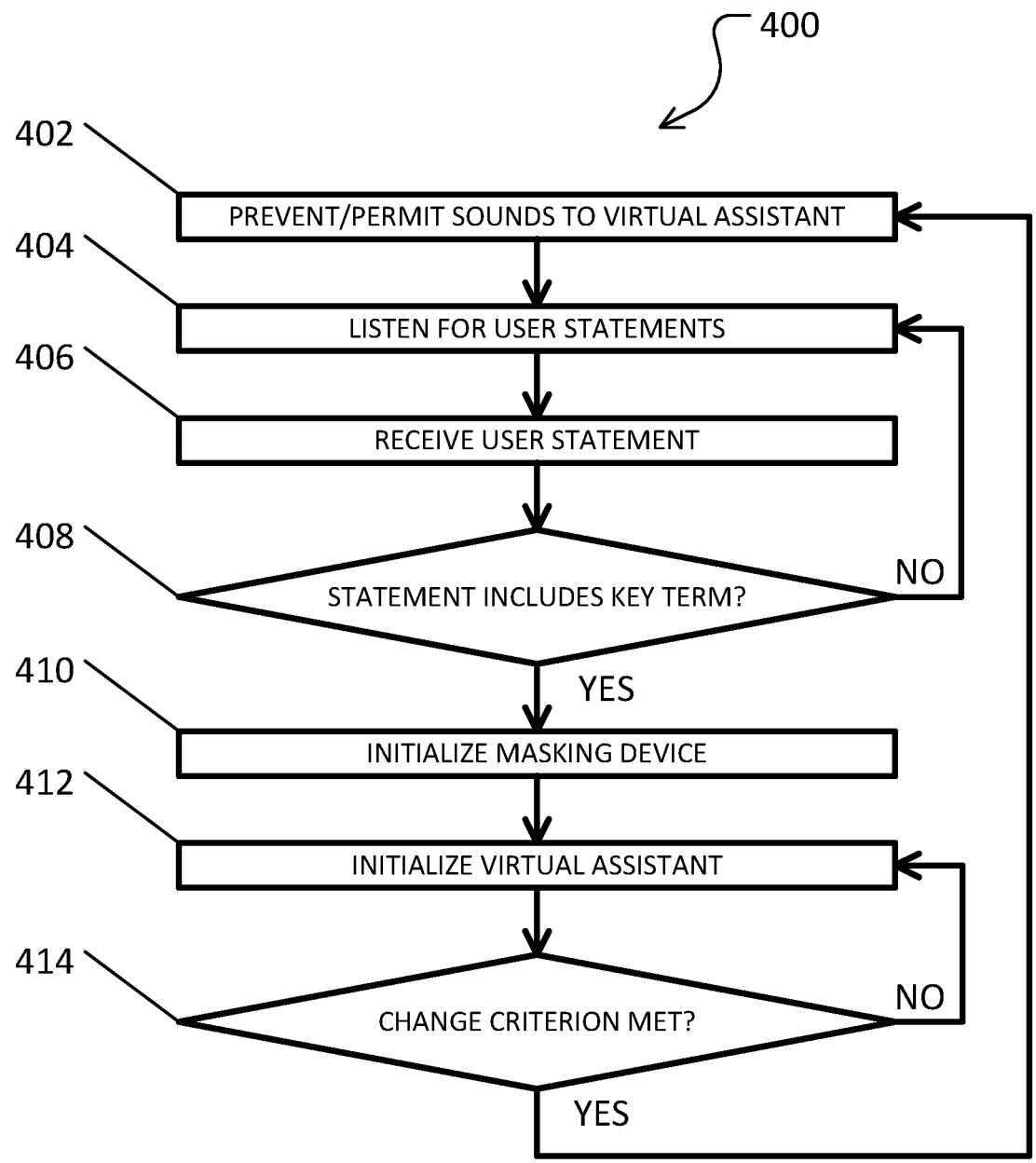
FIG. 5 is a flowchart of a method of using a masking device for a virtual assistant, according to embodiments of the present disclosure.

FIG. 5 is a flowchart of method 400 of using a masking device (such as masking device 100, 200, and/or 300) for a virtual assistant (such as virtual assistant 102 and/or 202). During the discussion of FIG. 5, some reference names and reference numerals from FIGS. 1-4 will be referred to.

At block 402, sounds (e.g., from a user) can be prevented from reaching the virtual assistant in an intelligible/processable form (a la masking devices 100 and 300). This can occur, for example, by a speaker emitting masking sounds, such as white noise or active noise cancelation (e.g., destructive sound waves) to the microphone of the virtual assistant. Alternatively, at block 402, sounds (e.g., from a user) can be permitted to reach the virtual assistant in an intelligible/processable form (a la masking device 200). At block 404, the masking device listens for verbal statements from the user. At block 406, the masking device detects a verbal statement from the user. At block 408, the verbal statement is analyzed to determine if it includes an initialization key term. If not, then method 400 returns to block 404. If so, then method 400 advances to block 410.

At block 410, the masking device is initialized. In some embodiments (a la masking devices 100 and 300), block 410 can include ceasing preventing (i.e., permitting) the virtual assistant to process verbal sounds from the user. This can occur, for example, by ceasing emitting masking noises or by opening a door that covers a microphone of the virtual assistant. In some embodiments (á la masking device 200), block 410 can include sending a signal to an actuator and/or sending a signal to a power switch. At block 412, the virtual assistant is initialized by the masking device. In some embodiments (a la masking devices 100 and 300), block 412 can include stating the key term of the virtual assistant or playing a recording of the user stating the key term of the virtual assistant. In some embodiments (a la masking device 200), block 412 can include pressing a mute or power button of the virtual assistant or cutting off electrical power to the virtual assistant.

At block 414, the masking device determines whether a change criterion has been met. The change criterion can be, for example, that a predetermined amount of time has passed, a predetermined amount of time has passed after the last communication, a finalization key term has been stated by the user (which can be the same as or different than the initialization key term), or analysis of the user's speech indicates a change in context. If not, then method 400 returns to block 412. If so, then method 400 returns to block 402.

Figure 6:
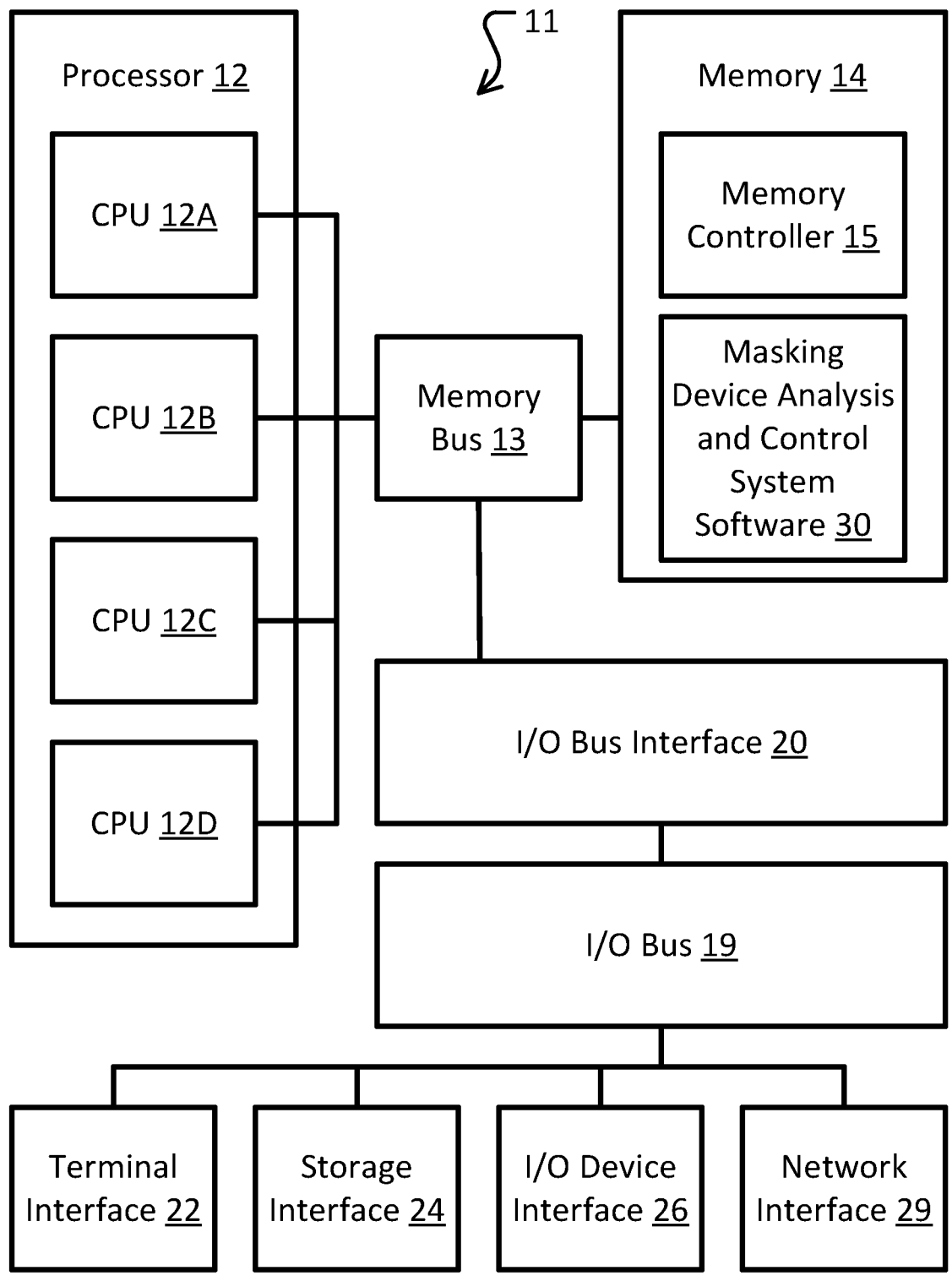
FIG. 6 shows a high-level block diagram of an example computer system that can be used in implementing embodiments of the present disclosure.

Referring now to FIG. 6, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used in control system 116, 216, and/or 316 (shown in FIGS. 2-4, respectively). In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 6 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes masking device analysis and control system software 30. The execution of masking device analysis and control system software 30 30 enables computer system 11 to perform one or more of the functions described above in operating a masking device (for example, method 400, shown in FIG. 5).

It is noted that FIG. 6 is intended to depict representative components of an exemplary computer system 11. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
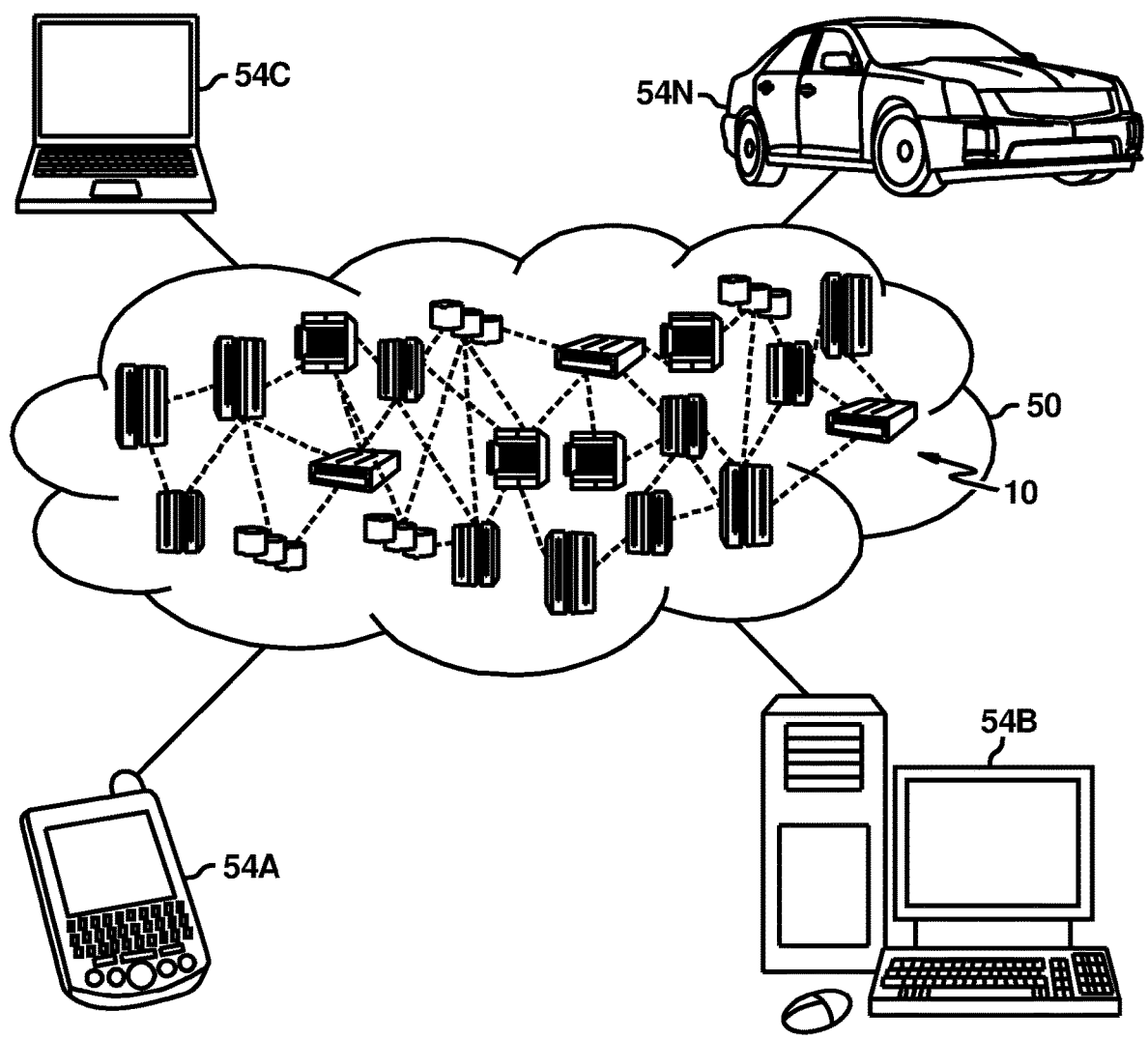
FIG. 7 shows a cloud computing environment, according to embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
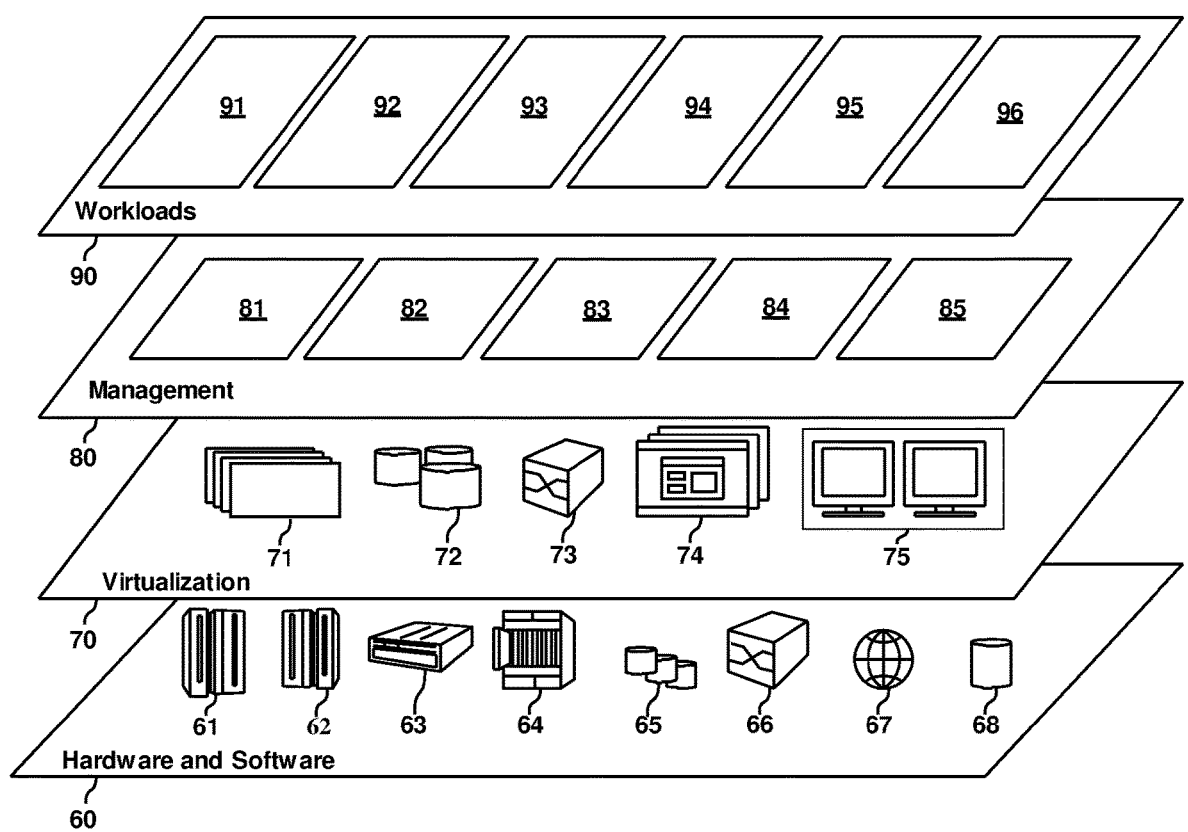
FIG. 8 shows abstraction model layers, according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and masking device analysis and control system 96.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A masking device for a virtual assistant, the masking device comprising:
   a body configured to at least partially block a virtual assistant microphone of the virtual assistant, wherein the masking device is configured to completely cover and surround the virtual assistant except for a bottom surface of the virtual assistant and a slot for a power cable of the virtual assistant;
   an assistant initializer in or on an inside of the body;
   a masking device microphone on an outside of the body; and
   a processor communicatively connected to the assistant initializer and the microphone, wherein the processor is configured to employ the assistant initializer to control an audio communication channel to the virtual assistant in response to the microphone receiving a first audio key term from a user.

2. The masking device of claim 1, wherein the assistant initializer is a speaker.

3. The masking device of claim 2, wherein the assistant initializer is configured to state a second audio key term to initialize the virtual assistant.

4. The masking device of claim 2, wherein the assistant initializer is configured to play a recording of the user stating a second audio key term to initialize the virtual assistant.

5. The masking device of claim 1, wherein the assistant initializer is an actuator configured to press a button on the virtual assistant to initialize the virtual assistant, and wherein the masking device comprises a camera configured to determine a position of the button and whether the actuator is properly positioned to press the button.

6. The masking device of claim 1, wherein the audio communication channel is normally closed, and the assistant initializer opens the audio communication channel in response to the microphone receiving the first audio key term from the user.

7. The masking device of claim 1, wherein the first audio key term is an indicator that sensitive information of the user is forthcoming.

8. The masking device of claim 7, wherein the audio communication channel is normally open, and the assistant initializer closes the audio communication channel in response to the microphone receiving the first audio key term from the user.

9. The masking device of claim 1, further comprising an antenna communicatively connected to the processor for communicating with a network.

10. A masking device for a virtual assistant, the masking device comprising:
    a body configured to at least partially block a virtual assistant microphone of the virtual assistant;
    an assistant initializer in or on an inside of the body;
    a masking device microphone on an outside of the body; and
    a processor communicatively connected to the assistant initializer and the microphone, wherein the processor is configured to employ the assistant initializer to control an audio communication channel to the virtual assistant in response to the microphone receiving a first audio key term from a user,
    wherein the inside of the body surrounds but is not attached to the virtual assistant.

11. The masking device of claim 1, wherein the body is adhered to the virtual assistant.

12. The masking device of claim 1, wherein the assistant initializer includes a speaker configured to emit masking sounds to the virtual assistant microphone.

13. The masking device of claim 1, further comprising:
    a camera communicatively connected to the processor wherein the processor is configured to receive image data from the camera to identify a brand, a model, and/or a location of the virtual assistant.

14. A method of operating a masking device for a virtual assistant, the method comprising:
    preventing, by the masking device, the virtual assistant from processing verbal sounds from a user, wherein the masking device is configured to completely cover and surround the virtual assistant except for a bottom surface of the virtual assistant and a slot for a power cable of the virtual assistant;
    receiving, by the masking device, a first audio key term spoken by a user;
    initializing the masking device in response to receiving the first audio key term;
    initializing, by the masking device, the virtual assistant; and
    permitting, by the masking device, a verbal command from the user to reach the initialized virtual assistant.

15. The method of claim 14, wherein initializing the virtual assistant comprises:
    stating, by the masking device, a second audio key term.

16. The method of claim 14, wherein initializing the virtual assistant comprises:
    playing, by the masking device, a recording of the user stating a second audio key term.

17. The method of claim 14, wherein preventing the virtual assistant from processing verbal sounds from the user comprises:
    emitting masking sounds to a virtual assistant microphone.

* * * * *